United States Patent
Meier

(10) Patent No.: US 6,523,109 B1
(45) Date of Patent: Feb. 18, 2003

(54) STORE QUEUE MULTIMATCH DETECTION

(75) Inventor: Stephan G. Meier, Sunnyvale, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/433,189

(22) Filed: Oct. 25, 1999

(51) Int. Cl.[7] .............. G06F 9/44; G06F 9/445; G06F 13/42
(52) U.S. Cl. ............... 712/225; 711/123; 711/133; 712/245
(58) Field of Search ................ 711/136, 123, 711/134, 144, 122, 116, 145, 125, 138, 118, 137, 142, 140, 143, 169, 213, 154, 131, 220, 133; 712/23, 217, 207, 218, 216, 213, 214, 225, 245; 710/6, 56, 5

(56) References Cited

U.S. PATENT DOCUMENTS

| | | | |
|---|---|---|---|
| 5,377,336 A | * 12/1994 | Eickemeyer et al. | 712/207 |
| 5,450,564 A | 9/1995 | Hassler et al. | 711/158 |
| 5,465,336 A | 11/1995 | Imai et al. | 712/216 |
| 5,471,598 A | 11/1995 | Quattromani et al. | 711/122 |
| 5,590,352 A | * 12/1996 | Zuraski, Jr. et al. | 712/23 |
| 5,606,670 A | 2/1997 | Abramson et al. | 711/154 |
| 5,737,759 A | 4/1998 | Merchant | 711/146 |
| 5,745,729 A | * 4/1998 | Greenley et al. | 711/131 |
| 5,748,920 A | 5/1998 | Mills et al. | 710/310 |
| 5,802,588 A | 9/1998 | Ramagopal et al. | 711/156 |
| 5,809,530 A | 9/1998 | Samra et al. | 711/140 |
| 5,832,297 A | 11/1998 | Ramagopal et al. | 710/56 |
| 5,835,747 A | 11/1998 | Trull | 712/216 |
| 5,884,067 A | 3/1999 | Storm et al. | 711/167 |
| 6,021,485 A | 2/2000 | Feiste et al. | 712/216 |
| 6,141,747 A | 10/2000 | Witt | 712/225 |
| 6,247,097 B1 | 6/2001 | Sinharoy | 711/125 |

FOREIGN PATENT DOCUMENTS

| | | |
|---|---|---|
| EP | 0 651 323 | 5/1995 |
| EP | 0 651 331 | 5/1995 |
| EP | 0 727 737 | 8/1996 |
| WO | 97/27538 | 7/1997 |

* cited by examiner

*Primary Examiner*—Daniel H. Pan
(74) *Attorney, Agent, or Firm*—Lawrence J. Merkel

(57) ABSTRACT

A processor includes a store queue configured to detect a hit on a store queue entry for a load being executed by the processor, and to forward data from the store queue entry to provide a result for the load. The store queue data is provided to the data cache, along with an indication of how much data is being provided (e.g. byte enables). The data cache may then fill in any additional data accessed by the load from cache data, and provide a load result. Additionally, the store queue is configured to detect if more than one store queue entry is hit (i.e. that more than one store within the store queue updates at least one byte accessed by the load), referred to as a multimatch. If a multimatch is detected, the store queue retries the load. Subsequently, the load may be reexecuted and may not multimatch (as entries are deleted upon completion of the corresponding stores). The load may complete when it does not multimatch. In one embodiment, the store queue independently detects hits on the upper and lower portions of each store queue entry (e.g. doubleword portions) and forwards from the upper and lower portions independently. Thus, a load may hit one store queue entry for the lower portion of the data accessed by the load and a different store queue entry for the upper portion of the data accessed by the load without multimatch detection.

33 Claims, 10 Drawing Sheets

STORE QUEUE MULTIMATCH DETECTION

BACKGROUND OF THE INVENTION

1. Field of the Invention

This invention is related to the field of processors and, more particularly, to dependency checking and forwarding from a store queue within processors.

2. Description of the Related Art

Processors often include store queues to buffer store memory operations which have been executed but which are still speculative and/or have been retired but not yet committed to memory. The store memory operations may be held in the store queue until they are retired. Subsequent to retirement, the store memory operations may be committed to the cache and/or memory. As used herein, a memory operation is an operation specifying a transfer of data between a processor and a main memory (although the transfer may be completed in cache). Load memory operations specify a transfer of data from memory to the processor, and store memory operations specify a transfer of data from the processor to memory. Memory operations may be an implicit part of an instruction which includes a memory operation, or may be explicit load/store instructions. Load memory operations may be more succinctly referred to herein as "loads". Similarly, store memory operations may be more succinctly referred to as "stores".

While executing stores speculatively and queueing them in the store queue may allow for increased performance in a number of fashions (e.g. by providing early store address calculation for detecting load-hit-store scenarios, by allowing for cache line fills to be started if a store misses and the cache is operating in a write allocate mode, and/or by removing the stores from the instruction execution pipeline and allowing other, subsequent instructions to execute), subsequent loads may access the memory locations updated by the stores in the store queue. While processor performance is not necessarily directly affected by having stores queued in the store queue, performance may be affected if subsequent loads are delayed due to accessing memory locations updated by stores in the store queue.

Still further, loads and stores may generally access arbitrary bytes within memory. Thus, it is possible that a given load may access one or more bytes updated by one store in the store queue and one or more additional bytes updated by another store in the store queue. As used herein, a store queue entry storing a store memory operation is referred to as being "hit" by a load memory operation if at least one byte updated by the store memory operation is accessed by the load memory operation. The circuitry for detecting the various cases of loads hitting one or more store queue entries may be quite complex. Thus, the circuitry may occupy a large area of semiconductor substrate and/or may increase latency in performing loads. A mechanism for correctly handling loads hitting in the store queue, which conserves the amount of circuitry used and decreases average load latency, is desired.

It is noted that loads, stores, and other instruction operations may be referred to herein as being older or younger than other instruction operations. A first instruction is older than a second instruction if the first instruction precedes the second instruction in program order (i.e. the order of the instructions in the program being executed). A first instruction in younger than a second instruction if the first instruction is subsequent to the second instruction in program order.

SUMMARY OF THE INVENTION

The problems outlined above are in large part solved by a processor including a store queue as described herein. The store queue is configured to detect a hit on a store queue entry for a load being executed by the processor, and to forward data from the store queue entry to provide a result for the load. The store queue data is provided to the data cache, along with an indication of how much data is being provided (e.g. byte enables). The data cache may then fill in any additional data accessed by the load from cache data, and provide a load result. Additionally, the store queue is configured to detect if more than one store queue entry is hit (i.e. that more than one store within the store queue updates at least one byte accessed by the load), referred to as a multimatch. If a multimatch is detected, the store queue may signal a retry of the load. Subsequently, the load may be reexecuted and may not multimatch (as entries are deleted upon completion of the corresponding stores). The load may complete when it does not multimatch. The combination of forwarding from the youngest store (which is older than the load) and retrying on multimatch cases may, in one embodiment, provide for less complicated store queue forwarding circuitry while still allowing for store queue forwarding (which may decrease average load latency).

In one embodiment, the store queue independently detects hits on the upper and lower portions of each store queue entry (e.g. doubleword portions) and forwards from the upper and lower portions independently. Thus, a load may hit one store queue entry for the lower portion of the data accessed by the load and a different store queue entry for the upper portion of the data accessed by the load without multimatch detection. Such a configuration may optimize code sequences in which two separate stores update the upper and lower portions and a subsequent load accesses both the upper and lower portions without substantially complicating the store queue forwarding circuitry. Thus, the optimized code sequence may achieve lower average load latency.

Broadly speaking, a store queue is contemplated. The store queue comprises a first buffer and a multimatch circuit. The first buffer includes at least a first entry and a second entry, wherein each entry is configured to store information corresponding to a store memory operation. Additionally, the first buffer includes circuitry configured to assert a first match signal in response to detecting a load memory operation hitting the first entry and further configured to assert a second match signal in response to the load memory operation hitting the second entry. Coupled to receive the first match signal and the second match signal, the multimatch circuit is configured to assert a multimatch signal responsive to an assertion of both the first match signal and the second match signal. Additionally, a processor is contemplated comprising the store queue and a data cache coupled to the store queue. The data cache is configured to merge cache data with store queue data to produce load data corresponding to the load memory operation. Still further, a computer system is contemplated including the processor and an input/output (I/O) device configured to communicate between the computer system and another computer system to which the I/O device is couplable Moreover, a method is contemplated. Load information corresponding to a load memory operation is received in a store queue, the store queue including a plurality of entries, each of the plurality of entries configured to store information corresponding to a store memory operation. A multimatch signal is asserted in response to the load memory operation hitting two or more of the plurality of entries. The load memory operation is retried responsive to asserting the multimatch signal.

BRIEF DESCRIPTION OF THE DRAWINGS

Other objects and advantages of the invention will become apparent upon reading the following detailed description and upon reference to the accompanying drawings in which.

Figure 1:
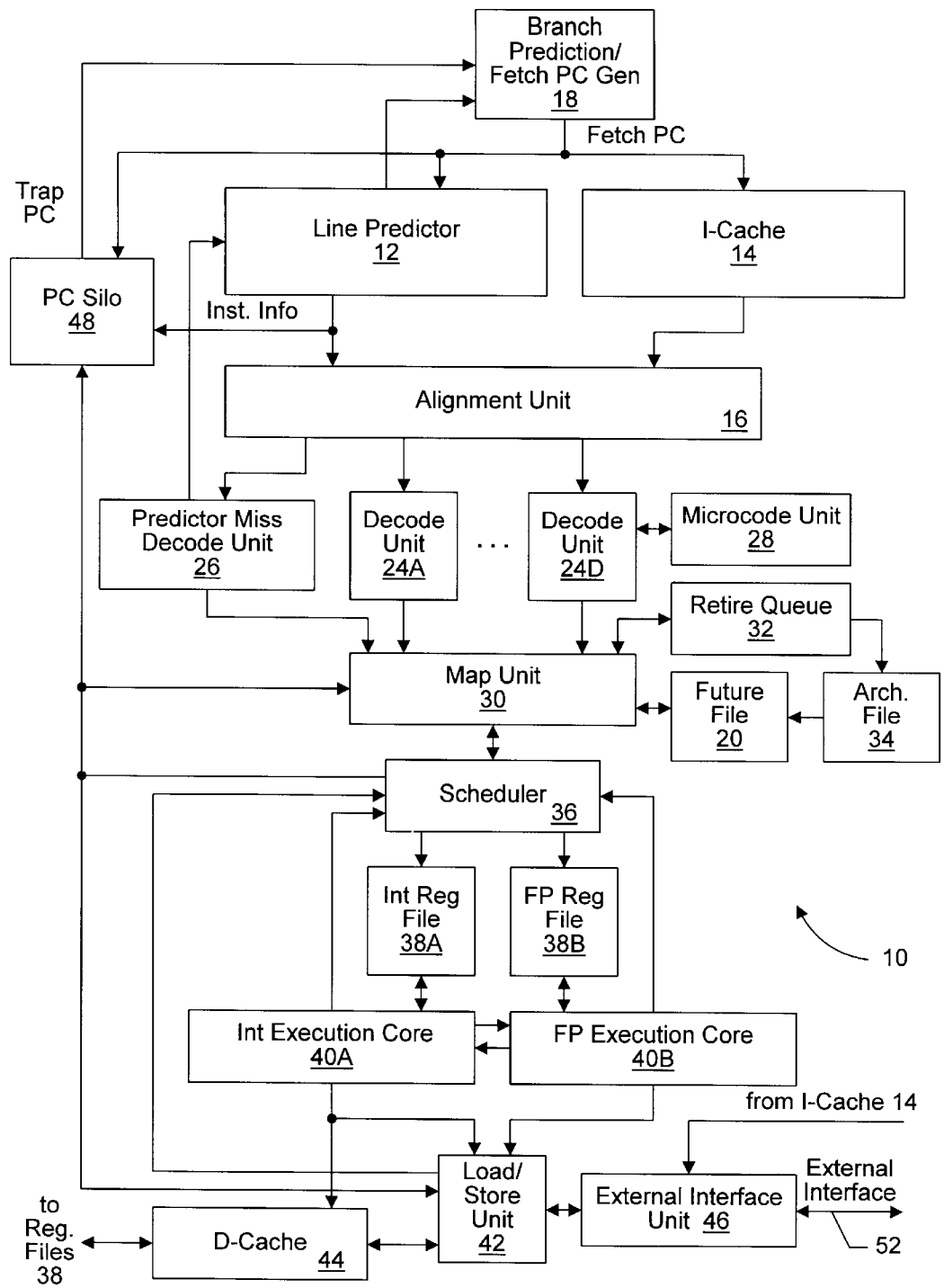
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiment, line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24B decode the instructions provided thereto, and each decode unit 24A–24D generates information identifying one or more instruction operations (or ROPs) corresponding to the instructions. In one embodiment, each decode unit 24A–24B may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, PC silo 48 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by PC silo 48. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the scheduler queue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement and update of D-cache 44). Additionally, load/store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set-associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
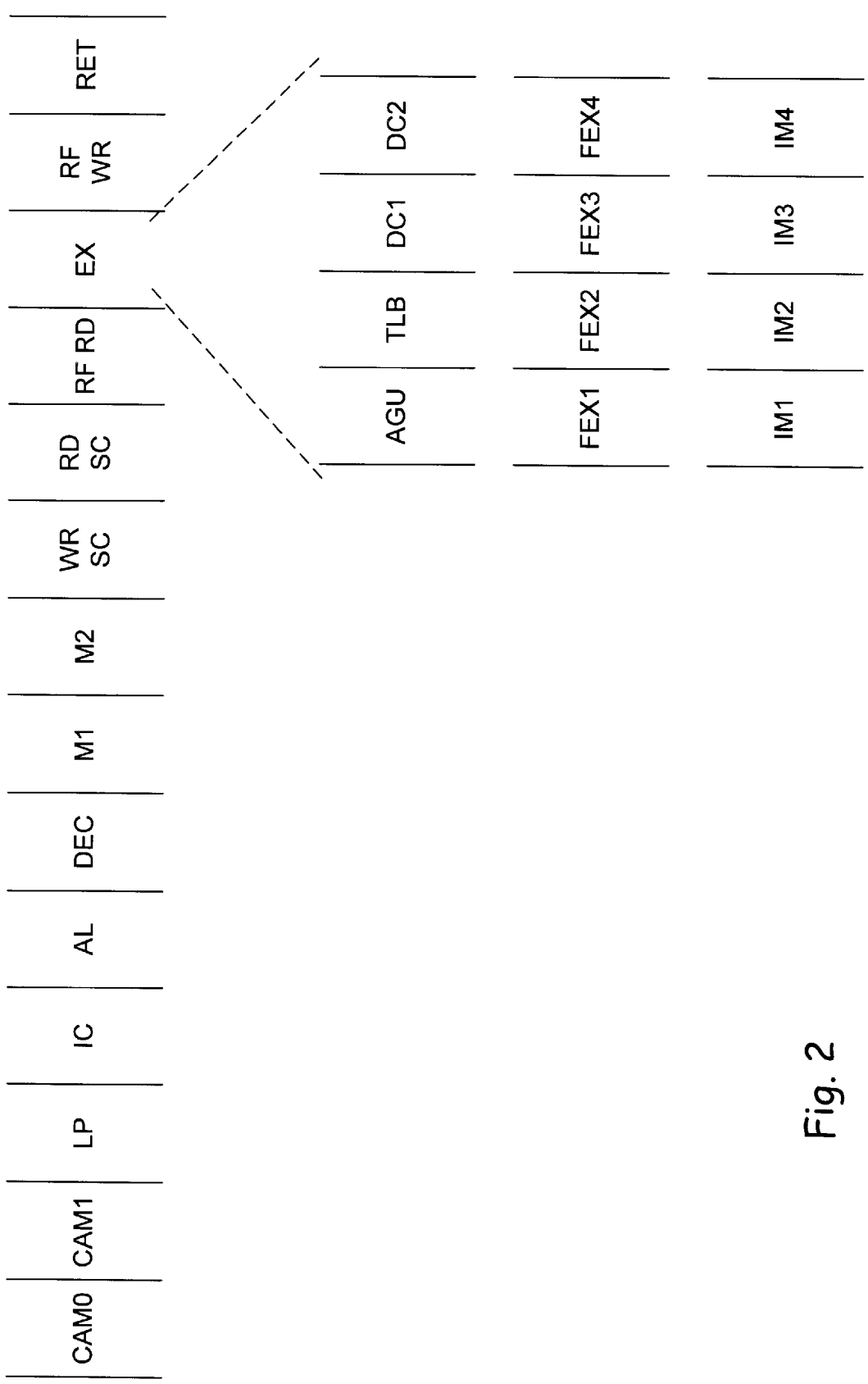
FIG. 2 is a pipeline diagram illustrating an exemplary pipeline which may be employed by one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical dashed lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address of the memory location accessed by the memory instruction operation is generated), a translation stage (in which the virtual data address provided by the address generation stage is translated) and a pair of data cache stages in which D-cache 44 is accessed. Floating point operations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the retire stage). Again, one or more clock cycles may elapse for a particular ROP between the register file write stage and the retire stage. Furthermore, a particular ROP may be stalled at any stage due to pipeline stall conditions, as is well known in the art.

Store Queue

Figure 3:
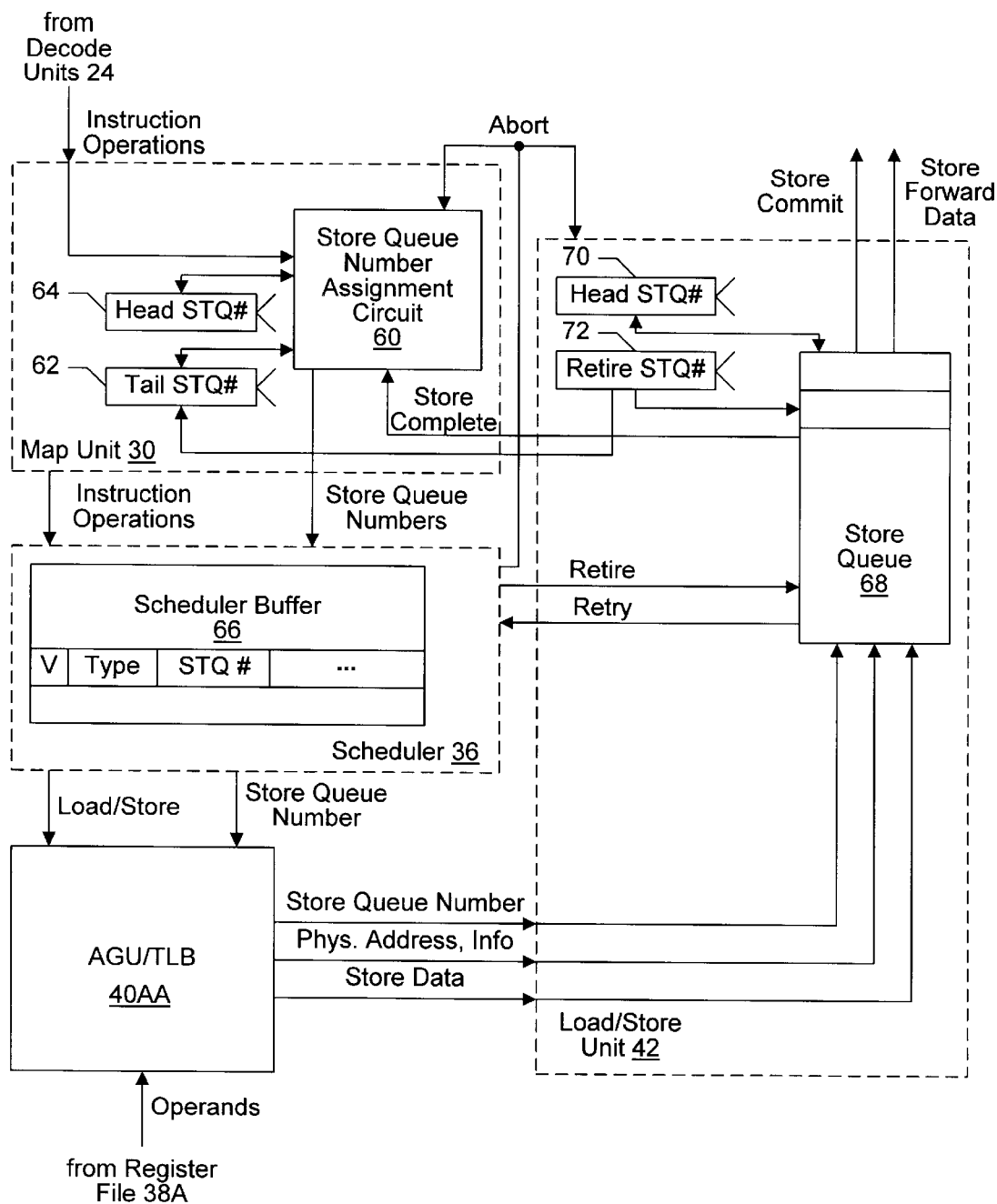
FIG. 3 is a block diagram of one embodiment of a map unit, a scheduler, an AGU/TLB, and a load/store unit shown in more detail.

Turning now to FIG. 3, a block diagram illustrating one embodiment of map unit 30, scheduler 36, an address generation unit/translation lookaside buffer (AGU/TLB) 40AA, and load/store unit 42 in greater detail is shown. Other embodiments are possible and contemplated. In the embodiment of FIG. 3, map unit 30 includes a store queue number assignment circuit 60, a tail store queue number register 62, and a head store queue number register 64. Scheduler 36 includes a scheduler buffer 66. Load/store unit 42 includes a store queue 68, a head store queue number register 70, and a retire store queue number register 72. Map unit 30 is coupled to receive instruction operations from decode units 24 and an abort signal from scheduler 36, and to provide the instruction operations and store queue numbers to scheduler buffer 36. More particularly, store queue number assignment circuit 60 is coupled to receive the instruction operations and abort signal, and is coupled to tail store queue number register 62 and head store queue number register 64. Store queue number assignment circuit 60 is coupled to receive a store complete signal from store queue 68, and to provide the assigned store queue numbers to scheduler 36. Scheduler 36 is coupled to provide loads and stores to AGU/TLB 40AA, along with the corresponding store queue number. AGU/TLB 40AA is coupled to receive corresponding operands from register file 38A and to provide a physical address and other memory operation information to store queue 68, along with the store queue number and, in the case of a store, store data. Store queue 68 is coupled to receive a retire signal from scheduler 36 and to provide a store to commit and store forward data to D-cache 44. Additionally, store queue 68 is coupled to retire store queue number register 72 and head store queue number register 70. Retire store queue number register 72 is coupled to tail store queue number register 62. In one embodiment, AGU/TLB 40AA is part of integer execution core 40A.

Generally, instruction operations are received by map unit 30 from decode units 24. Store queue number assignment circuit 60 scans the instruction operations for loads and stores. Stores are assigned store queue numbers (which identify a store queue entry assigned to the store) from the tail of the store queue (as indicated in tail store queue number register 62), and the tail store queue number is incremented. However, if the tail store queue number equals the head store queue number indicated by head store queue number register 64, store queue 68 is full and thus the store is stalled until older stores in store queue 68 are completed. Effectively, map unit 30 reserves store queue entries for stores as the stores are processed by map unit 30. Additionally, loads are assigned the current store queue number as well. The store queue number assigned to a load identifies the store queue entry storing the youngest store within store queue 68 which precedes the load in program order. During execution of the load, the store queue number (in combination with the head store queue number) identifies the store queue entries on which the load may hit.

Map unit 30 passes the instruction operations and assigned store queue numbers to scheduler 36, which writes the instruction operations into scheduler buffer 66. An exemplary memory operation entry is illustrated in scheduler buffer 66, including a valid bit, a type field (identifying the entry as storing a memory operation and which type of memory operation is stored, either load or store). For memory operations, the assigned store queue number is also stored. Additional information may be stored as well (e.g. size information, operand PR#s, etc.), and other types of entries (e.g. integer, floating point, etc.) may have different formats. Scheduler 36 schedules the memory operation for execution subsequent to each of its dependencies being satisfied, and conveys the load/store nature of the operation and the assigned store queue number to AGU/TLB 40AA.

AGU/TLB 40AA receives the memory operation and operands (read from register file 38A in response to PR#s from scheduler 36). AGU/TLB 40AA adds the operands to produce a virtual address, and translates the virtual address to a physical address using translations cached in the TLB. AGU/TLB 40AA provides the physical address and other information to store queue 68, as well as the store queue number. Store data is also provided, if the operation is a store. Among the information provided by AGU/TLB 40AA may be the load or store nature of the operation. The physical address and other information is also provided by AGU/TLB 40AA to D-cache 44.

If the memory operation is a store, store queue 68 stores the information provided by AGU/TLB 40AA into the entry designated by the store queue number. On the other hand, if the memory operation is a load, store queue 68 compares the load information to the information in the store queue entries. If a hit on a store queue entry is detected, the corresponding store queue data is read and provided to D-cache 44 for forwarding (store forward data in FIG. 3). The store queue number provided with the load identifies the youngest store within store queue 68 which should be considered for determining if the load hits the store queue. Entries between the identified entry and the entry identified by head store queue number register 70 are eligible to be hit, and other entries are not eligible.

Additionally, as described below, store queue 68 may retry the load memory operation if more than one store queue entry is hit. Generally, a memory operation is referred to herein as "retried" if the operation's state within scheduler 36 is reset to a not executed state. Retrying the memory operation subsequently leads to the memory operation being rescheduled and reexecuted. Since hitting more than one store queue entry may indicate that bytes accessed by the load are to be read from more than one entry, store queue 68 may retry the load instead of attempting to provide the hardware for selecting bytes from multiple store queue entries for forwarding. Alternatively, the load may only be retried if not all of the bytes accessed by the load are provided by the most recent store. In one particular embodiment, the store queue is divided into upper and lower halves. Different entries may be hit for the upper half and the lower half, but multiple hits in either half indicate a retry. A multimatch signal is generated by comparing the load information to the information in the store queue entries, and is used to generate the retry signal for the load. If a multimatch is not detected, D-cache 44 may merge the store forward data with cache data (to fill bytes not provided by the store) and may forward the merged data as the result of the load.

Store queue 68 retains the stores at least until they are retired by scheduler 36. Generally, the stores may be retained until they are committed to the memory system (which may occur coincident with or after retirement of the stores). Scheduler 36 signals store queue 68 via the retire signal to indicate retirement of one or more stores. In response to the retirement of stores, store queue 68 increments the retire store queue number in retire store queue number register 72. Stores in entries between the head store queue entry indicated by head store queue number register 70 and the entry indicated by the retire store queue number are eligible for commitment to D-cache 44 and/or memory. Store queue 68 conveys the retired stores, in order, using the store commit path to D-cache 44. After successfully committing a store, store queue 68 signals store queue number assignment circuit 60 that a store is complete. Store queue 68 increments the store queue number in head store queue number register 70 and, in response to the store complete signal, store queue number assignment circuit 60 increments the store queue number stored in head store queue number register 64. Thus, the store queue entries of completed stores become available for subsequent stores.

If scheduler 36 detects various types of exception conditions for a particular instruction operation, scheduler 36 aborts the instruction operations in scheduler buffer 66 when that particular instruction operation is otherwise eligible for retirement. Accordingly, stores in store queue 68 which have not retired when the abort signal is asserted by scheduler 36 are invalidated. Additionally, store queue number assignment circuit 60 receives the abort signal and, in response, copies the store queue number in retire store queue number register 72 into tail store queue number register 62. In this manner, store queue number assignment circuit 60 recognizes the freeing of the store queue entries corresponding to the aborted stores.

It is noted that a load may be delayed from scheduling until after the store queue entry identified by the load's store queue number has been reused for a different store, younger than the load. To detect this scenario (and thus prevent a false match of the load on a younger store), in one embodiment, store queue numbers include sufficient bits to enumerate each store queue entry along with an additional most significant bit which is toggled each time the maximum store queue number is reached and another increment occurs. Since a store queue entry cannot be reused twice prior to the retirement of a load having the store queue number, the additional most significant bit (a "toggle" bit) can be used to indicate whether or not the load's store queue number is still valid.

It is further noted that various combinations of AGUs and TLBs are possible. For example, in one embodiment, a load AGU and a separate store AGU are contemplated The store AGU may be coupled to a write port on store queue 68, and the load AGU may be coupled to a compare port on store queue 68. Other embodiments may include any number of AGUs for loads, stores, or loads and stores, as desired.

It is noted that, while certain details of the various units shown in FIG. 3 are illustrated, other details and features unrelated to the detection of loads hitting in the store queue may have been omitted for simplicity. For example, map unit 30 may perform register renaming, as described above with respect to FIG. 1.

Figure 4:
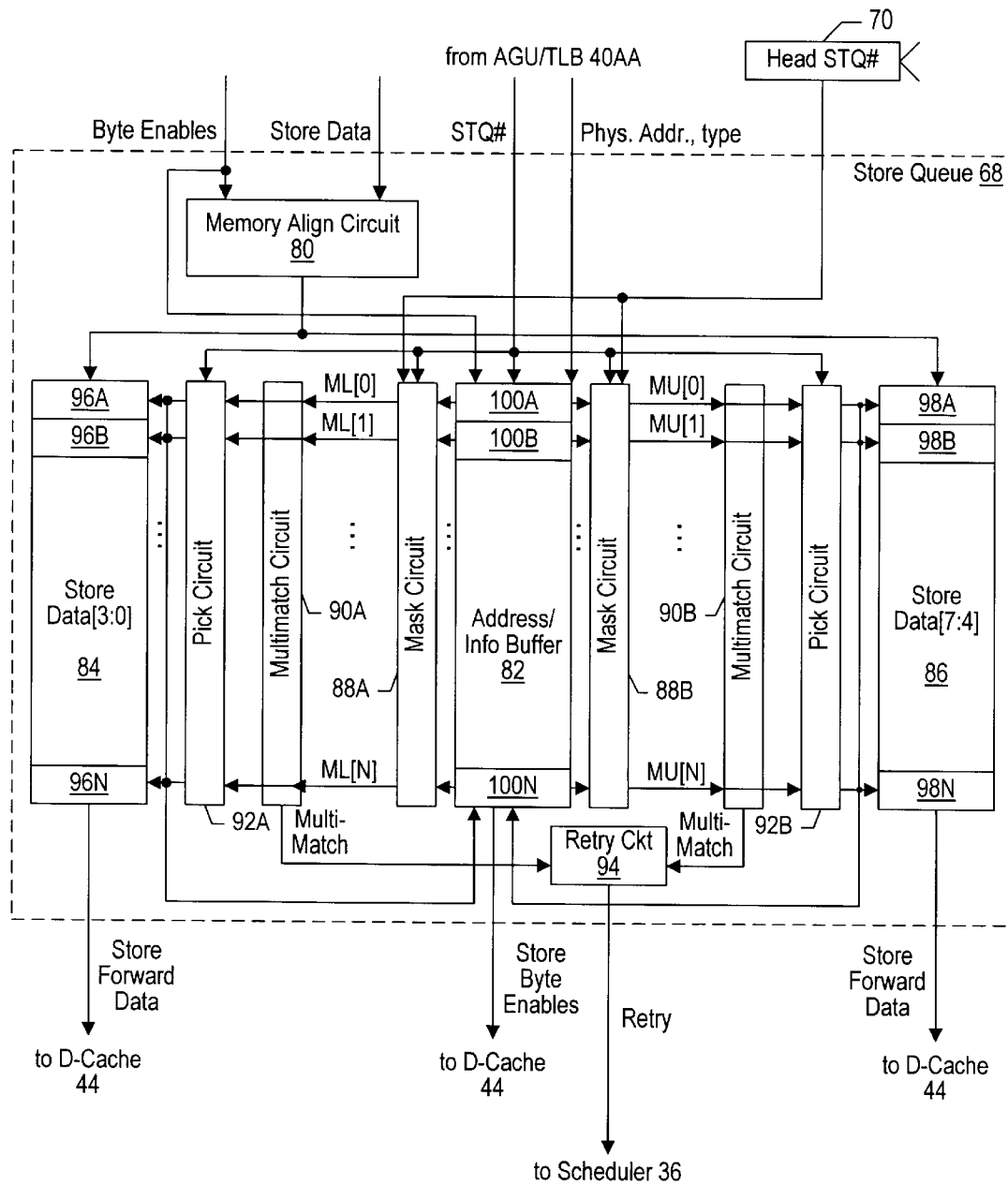
FIG. 4 is a block diagram of one embodiment of a store queue.

Turning next to FIG. 4, a block diagram of one embodiment of store queue 68 is shown. Other embodiments are possible and contemplated. The portions of store queue 68 shown in FIG. 4 are related to multimatch detection, and thus store queue 66 may include additional features, not shown, in various embodiments. In the embodiment of FIG. 4, store queue 68 includes a memory align circuit 80, an address/info buffer 82, a lower store data buffer 84, an upper store data buffer 86, a pair of mask circuits 88A and 88B, a pair of multimatch circuits 90A and 90B, a pair of pick circuits 92A and 92B, and a retry circuit 94. Memory align circuit 80 is coupled to receive the store data corresponding to a store and a set of byte enables corresponding to the store (from AGU/TLB 40AA), and is coupled to lower store data buffer 84 and upper store data buffer 86. The byte enables are also provided to address/info buffer 82. Address/info buffer 82 is coupled to receive the physical address and type information from AGU/TLB 40AA, and is coupled to mask circuits 88A and 88B. Mask circuits 88A and 88B are coupled to multimatch circuits 90A and 90B, respectively, and are coupled to receive the store queue number from AGU/TLB 40AA and the head store queue number from head store queue number register 70. Mask circuits 88A and 88B are further coupled to pick circuits 92A and 92B, respectively. Pick circuits 92A and 92B are coupled to lower store data buffer 84 and upper store data buffer 86, respectively, and are each coupled to address/info buffer 84. Multimatch circuits 90A–90B are coupled to provide a multimatch signal to retry circuit 94, which is coupled to provide the retry signal to scheduler 36. Address/info buffer 92 is coupled to provided store byte enables to D-cache 44. Lower store data buffer 84 and upper store data buffer 86 are coupled to provide store forward data to D-cache 44.

Store queue 68 comprises a plurality of store queue entries. As illustrated in FIG. 4, store queue 68 includes: (i) lower store data buffer 84 comprising a plurality of entries (e.g. 96A–96N), each entry 96A–96N capable of storing the lower memory-aligned data bytes of a store (bytes 3:0); (ii) upper store data buffer 86 comprising a plurality of entries (e.g. 98A–98N), each entry 98A–98N capable of storing the upper memory-aligned data bytes of a store (bytes 7:4); and (iii) address/info buffer 82 comprises a plurality of entries (e.g. 100A–100N), each entry 100A–100N capable of storing the physical address and other information related to a store. A store queue entry may thus comprise an entry in each of lower store data buffer 84, upper store data buffer 86, and address/info buffer 82. For example, a store queue entry may comprise entry 96A, entry 98A, and entry 100A. The number of entries in store queue 68 may be any suitable number. For example, a number if the range of 32–80 may be suitable. In one particular embodiment, the number of entries may be 48, for example. It is noted that the data bytes stored in a store queue entry are memory aligned. Accordingly, a misaligned store may actually have the first bytes updated by the store located in the upper data bytes storage, with the remaining data bytes being stored in the lower data bytes storage.

Generally, in response to load information provided by AGU/TLB 40AA, store queue 68 determines whether or not a store queue entry is hit by the load and whether or not two or more store queue entries are hit by the load (a multimatch). In the present embodiment, store queue hit detection is divided into a lower portion (corresponding to lower store data buffer 84) and an upper portion (corresponding to upper store data buffer 86). Hit detection is performed independently on each portion, as described in more detail below (i.e. different entries may be hit in the upper portion and the lower portion without causing a multimatch to occur). Other embodiments may not provide such division, as desired. The discussion of hit detection and multimatch detection will focus on the lower portion (mask circuit 88A, multimatch circuit 90A, pick circuit 92A, and lower store data buffer 84). The operation of the upper portion (mask circuit 88B, multimatch circuit 90B, pick circuit 92B, and upper store data buffer 86) may be similar.

Figure 5:
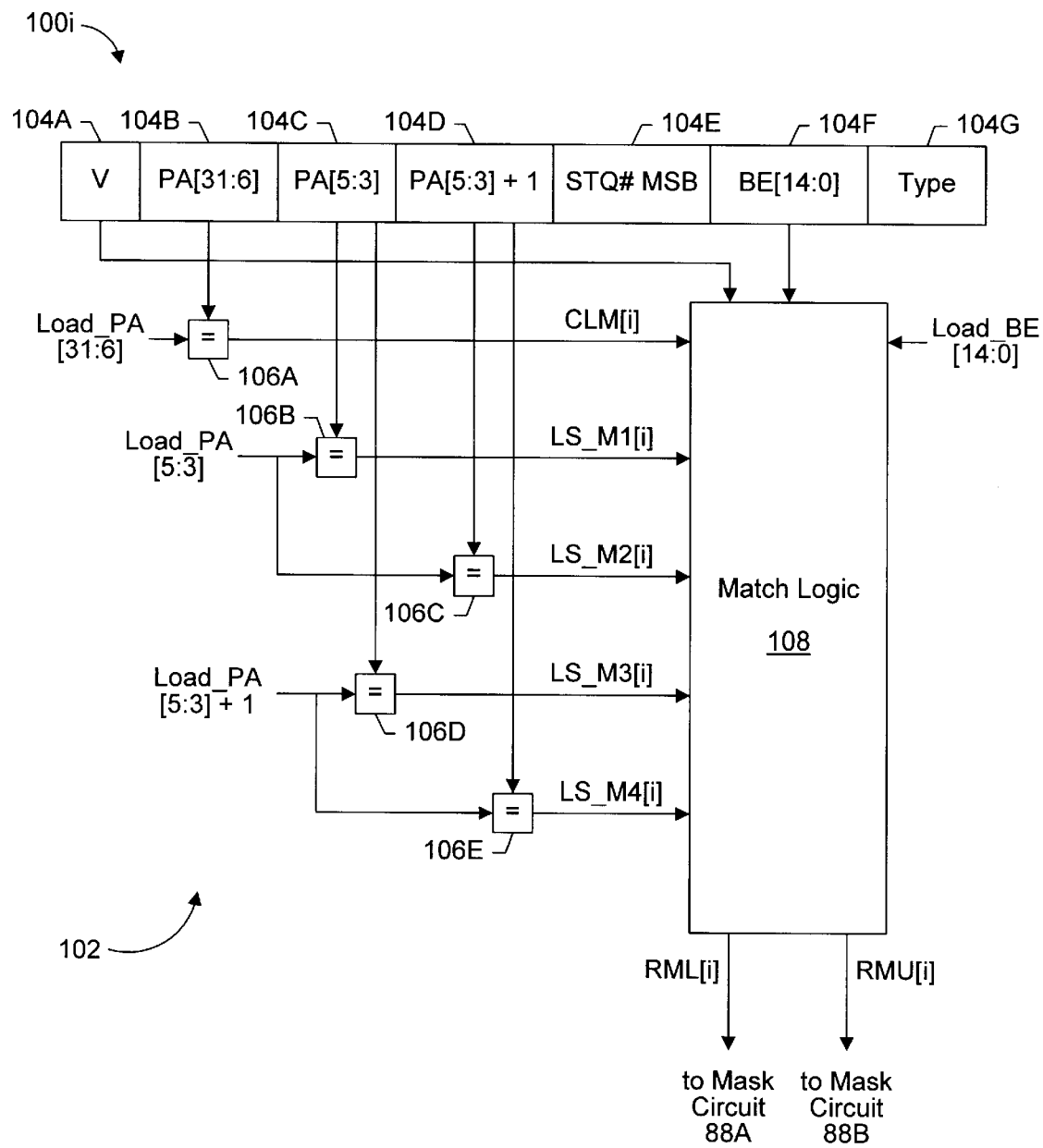
FIG. 5 is a block diagram of one embodiment of an address/info buffer entry and related circuitry.

Address/info buffer 82 receives the physical address information for the load and compares the information to the information stored in each entry 100 of address/info buffer 82. A particular embodiment of an entry 100 and related circuitry to produce a match signal is illustrated in FIG. 5 below. Thus, address/info buffer 82 may be a content addressable memory, according to one embodiment. If a hit on a given entry is detected, address/info buffer 82 asserts a corresponding match signal to mask circuit 88A. More particularly, a hit is detected for the lower portion of an entry if at least one byte within the lower portion of the entry is accessed by the load and updated by the corresponding store. Thus, each entry provides a match signal to mask circuit 88A.

Mask circuit 88A masks the match signals to eliminate matches which are ineligible for the current load (because the entry is allocated to a store which is younger than the load). Mask circuit 88A receives the store queue number assigned to the load and the head store queue number from head store queue number register 70. Mask circuit 88A passes the match signals corresponding to entries between the load's store queue number and the head store queue number and masks the remaining match signals by deasserting the remaining match signals. In this manner, matches are detected on stores which are older than the load but not on stores which are younger than the load. Generally, a signal is "masked" if it is deasserted by mask circuit 88A, regardless of whether or not the signal was asserted to mask circuit 88A by address/info buffer 82. The masked match signals ML[0] to ML[N] corresponding to each store queue entry are thus provided to both multimatch circuit 90A and pick circuit 92A in parallel.

Figure 8:
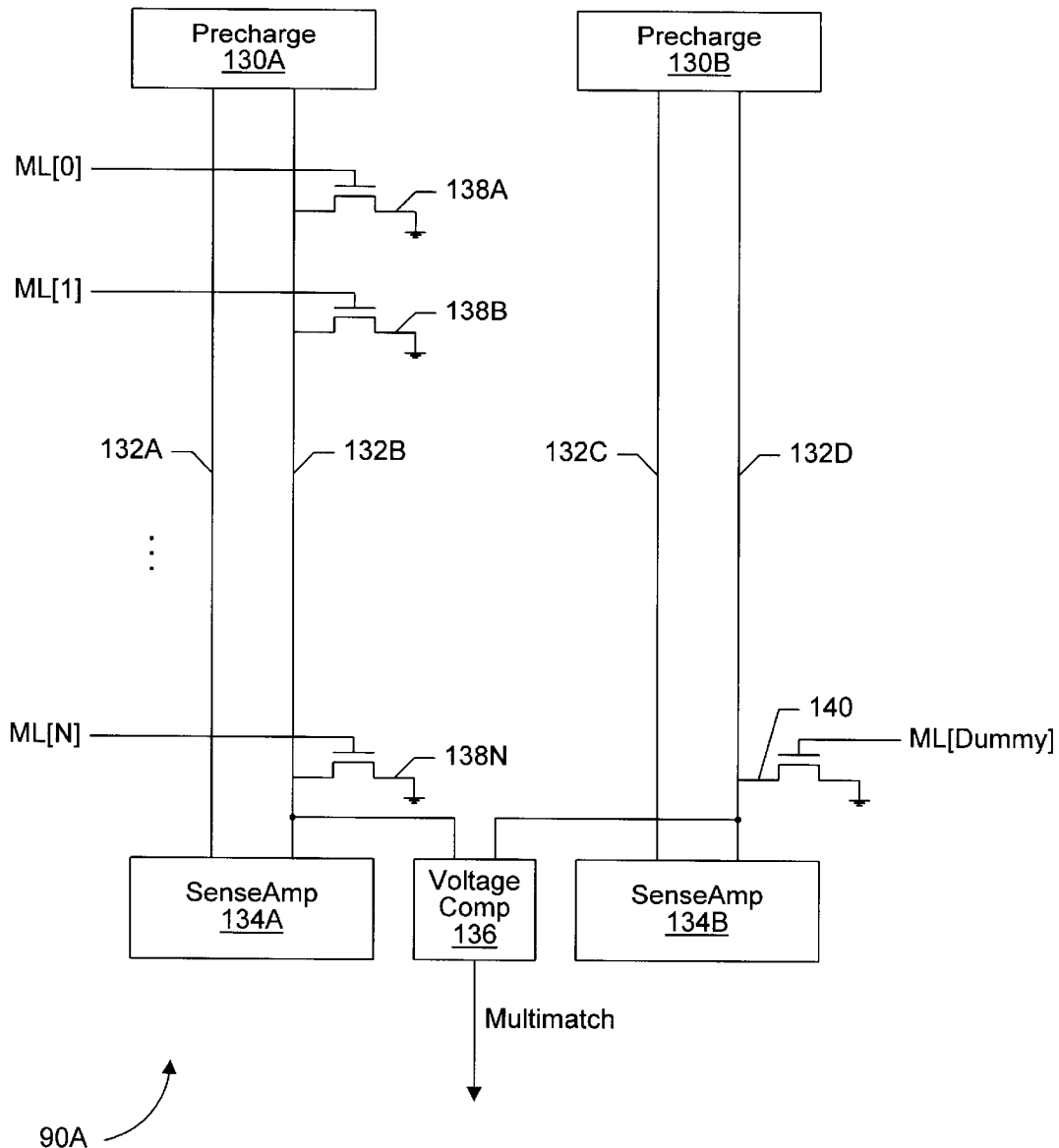
FIG. 8 is a block diagram of one embodiment of a multimatch circuit shown in FIG. 4.

Multimatch circuit 90A scans the match signals ML[0] through ML[N] and determines if two or more of the match signals are asserted. An exemplary embodiment of multimatch circuit 90A is shown in FIG. 8, although any suitable circuit may be used including circuits formed of static or dynamic combinatorial logic. If multimatch circuit 90A detects that more than one store queue entry is hit by the load, multimatch circuit 90A asserts the multimatch signal. If one or zero store queue entries are hit by the load, multimatch circuit 90A deasserts the multimatch signal. It is noted that, while in the present embodiment multimatch circuit 90A scans the masked match signals ML[0] through ML[N], other embodiments may operate differently. For example, an embodiment is contemplated in which unmasked match signals are scanned. Such an embodiment may exhibit more rapid detection of a multimatch situation, although in some cases a multimatch may be signalled when a multimatch does not actually occur.

Retry circuit 94 receives the multimatch signals from both multimatch circuits 90A and 90B, and asserts a retry signal if either multimatch signal is asserted. Thus, if a load hits more than one store queue entry (for a given upper or lower portion of the entry), the load is retried and rescheduled at a later time. As stores are completed and deleted from store queue 68, the multimatch will eventually not be detected for the load, and the load may be completed (with forwarding of store data from the store queue if a hit is still detected). Accordingly, pick circuits 92A and 92B may be configured to select one entry in corresponding lower store data buffer 84 and upper store data buffer 86 for forwarding of store data. The pick circuits may thereby be simplified. Furthermore, the data buffer arrays may be more densely implemented since each entry is accessed as a unit.

As mentioned above, store queue hits are detected and data forwarding is performed independently for the upper and lower portions of the data in the store queue entry. Splitting the detection into upper and lower portions optimizes a code sequence which the inventor has discovered happens frequently in certain types of code (where [A] means the address is A, and A is aligned to a four byte boundary):

Store(4 bytes) [A]
Store(4 bytes) [A+4]
Load(8 bytes) [A]

This code sequence may, for example, be frequent in MMX code sequences for embodiments employing the x86 instruction set architecture. Since address A is aligned to a four byte boundary and the second store is to the address A+4, and since bytes are stored in the store queue entry in a memory aligned fashion as discussed below, the bytes corresponding to the first store are stored in one of lower data buffer 84 and upper data buffer 86, and the bytes corresponding to the second store are stored in the other one of lower data buffer 84 and upper data buffer 86. Thus, assuming no other stores affecting the eight bytes accessed by the load are in store queue 68, store queue 68 may forward the bytes accessed by the load even though they are supplied by two different entries (due to the independent matching on the upper and lower portions of the entries). In some embodiments, hitting one store in one entry for the upper portion and a different store in a different entry for the lower portion may not result in a multimatch even if other older stores are hit (since each byte accessed by the load is provided by the youngest hit store in each of the upper and lower portions).

Pick circuit 92A receives the match signals ML[0] through ML[N] and the store queue number assigned to the load, and selects the youngest store in store queue 68 for which the corresponding match signal is asserted. In other words, the match signals are scanned beginning with the entry indicated by the store queue number assigned to the load. In this manner, the youngest store may forward data for the load to receive, and thus the load may receive correct data even though the store is still in the store queue. Pick circuit 92A asserts signals to lower store data buffer 84 to read the selected entry and forward the data therein to D-cache 44 (via the store forward data lines). Additionally, pick circuit 92A provides signals to address/info buffer 82. Byte enables corresponding to lower store data buffer 84 are provided (on the store byte enables lines) to D-cache 44. The byte enables corresponding to upper data buffer 86 are provided as well in response to input from pick circuit 92B. If no hit is detected for the lower portion, the byte enables provided are zero to indicate no bytes are provided from store queue 68. If more than one hit is detected, pick circuit 92A selects the youngest of the hits. However, in the present embodiment the multimatch signal may cause a retry of the load if more than one hit is detected (although some embodiments may not retry if all of the requested bytes are provided by the youngest hitting entry or if all the bytes in the store queue are provided by the youngest hitting entry). Thus, the data is not forwarded to the load in the case of multiple hits.

Store queue 68 is also coupled to receive store information for stores executed by AGU/TLB 40AA. The store data and store byte enables are provided to memory align circuit 80, which aligns the bytes according to the byte enables. Since the source operand of the store is a register, the bytes provided by AGU/TLB 40AA are register aligned (i.e. the least significant byte is in the least significant byte position, etc). However, the alignment for storage in memory is determined by the address of the store memory operation. The address, in the x86 architecture, specifies the memory location of the least significant byte. More significant bytes are stored at numerically greater addresses. The address may have arbitrary alignment in memory, and thus the least significant byte may be anywhere within the eight bytes forming a quadword of memory aligned store queue data storage. Thus, the first set byte enable indicates the position of the least significant byte within the quadword, and other bytes are aligned accordingly. In this manner, bytes are placed into their appropriate position within a quadword and may be provided for storage into D-cache 44 (which is organized into quadword banks, in the present embodiment). The quadword of store queue storage may store bytes which are actually within two adjacent memory quadwords (if the store crosses a quadword boundary). In this case, the least significant byte or bytes are stored in upper data buffer 86, and the most significant bytes which are contained within the next quadword of memory are stored in lower data buffer 84.

The memory aligned data is divided into upper and lower portions and stored in upper and lower store data buffers 86 and 84, respectively. Other information (including the physical address, store byte enables, etc.) is stored into address/info buffer 82. More particularly, the entry in each buffer identified by the store queue number is updated with the corresponding information.

Store queue 68 provides a quadword of data storage per entry in the present embodiment because the largest store specified in the x86 instruction set architecture is a quadword (for floating point and MMX stores). Other embodiments may provide more or less storage depending upon the instruction set architecture implemented. However, since store queue 68 handles stores which cross a quadword boundary, the byte enables provide positioning within an octword (16 bytes). Fifteen byte enables are provided, corresponding to the bytes within the octword. A byte enable is not provided for byte 15 since the worst-case misalignment which starts within a given quadword is an eight byte store beginning at byte 7, which ends at byte 14.

As described above, AGU/TLB 40AA may include a variety of configurations, and the interface between AGU/TLB 40AA may vary in a variety of ways. In one particular embodiment, AGU/TLB 40AA includes a load AGU and a separate store AGU. In such an embodiment, the two separate sets of communication lines (physical address info, store queue number, byte enables etc.) may be provided. The store AGU may be coupled to a write port of store queue 68 while the load AGU may be coupled to a compare port. Any configuration of AGUs (with the ability to execute loads, stores, or loads and stores) may be employed.

Turning next to FIG. 5, an exemplary entry 100*i* which may be employed in one embodiment of address/info buffer 82 is shown. Entry 100*i* may be representative of any entry 100A–100N illustrated in FIG. 4. Other embodiments are possible and contemplated. Additionally, FIG. 5 illustrates one embodiment of circuitry 102 used to detect a hit on entry 100*i* for a load provided to store queue 68. Similar circuitry may be employed for each entry 100 within address/info buffer 82.

Entry 100*i* includes a valid bit 104A, a first physical address field 104B, a second physical address field 104C, a third physical address field 104D, a store queue number most significant bit (MSB) field 104E, a byte enable field 104F, and a type field 104G. Valid bit 104A indicates whether or not entry 100*i* is valid.

First physical address field 104B stores bits 31:6 of the physical address of the store. In other words, first physical address field 104B stores the portion of the physical address which identifies the cache line updated by the store. In the present embodiment, D-cache 44 employs a 64 byte cache line size and thus bits 5:0 are the offset within the cache line. Other cache line sizes may be employed and the bits in first physical address field 104B may be adjusted accordingly. Second physical address field 104C stores the quadword address of the quadword within the cache line including the least significant byte of data updated by the store. Third physical address field 104D stores the next consecutive quadword address within the cache line, for stores which cross a quadword boundary within the cache line.

Store queue number MSB field 104E stores the most significant bit of the store queue number of the store. The store queue number MSB from the entry 100 indicated by the store queue number assigned to the load is compared to the MSB of the store queue number assigned to the load. If the values differ, the load is older than each store in store queue 68. Store queue 68 may cancel match processing and allow data to be forwarded from the cache in such a case.

Byte enable field 104F stores the byte enables corresponding to the store. A byte enable bit is provided for each byte within the octword which may be updated by a particular store which may be represented by the store queue entry (except for the most significant byte, byte 15, as described above with respect to FIG. 4). If the byte enable bit is set, the corresponding byte is updated by the store in entry 100*i*. If the byte enable bit is clear, the corresponding byte is not updated by the store in entry 100*i*. Byte enables 3:0 and 11:8 thus correspond to lower store data buffer 84 and byte enables 7:4 and 14:12 correspond to upper store data buffer 86. More particularly, byte enables 3:0 indicate an update of bytes in the lower portion of the quadword indicated by second physical address field 104C, and byte enables 11:8 indicate an update of bytes in the lower portion of the quadword indicated by third physical address field 104D. Similarly, byte enables 7:4 indicate an update of bytes in the upper portion of the quadword indicated by second physical address field 104C, and byte enables 14:12 indicate an update of bytes in the upper portion of the quadword indicated by third physical address field 104D. Finally, type field 104G stores memory type information (such as whether or not the store is cacheable, write through, etc.).

Thus, for each memory operation in the present embodiment, AGU/TLB 40AA provides the physical address of the quadword including the least significant byte accessed by the memory operation (PA[31:3]), the physical address of the next consecutive quadword within the cache line (PA[5:3]+1), the store queue number, and the byte enables indicating which bytes are affected by the memory operation.

Circuitry 102 determines if a load being executed by AGU/TLB 40AA may hit entry 100*i*. As mentioned above, store queue 68 may independently determine hits on the upper and lower portions of the store queue entries. Thus, circuitry 102 may produce a match signal RML[i] provided to mask circuit 88A and a match signal RMU[i] provide to mask circuit 88B, which may then generate corresponding ML[i] and MU[i] signals, respectively. Circuitry 102 includes comparators 106A–106E and match logic 108. Comparator 106A is coupled to receive the portion of the load physical address identifying the cache line accessed by the load (load_PA[31:6]) and the contents of first physical address field 104B, and generates a compare signal CLM[i]. The compare signal is asserted if the inputs to comparator 106A compare equal and deasserted otherwise. Comparators 106B–106C are both coupled to receive the quadword address of the least significant byte accessed by the load (load_PA[5:3]). Comparator 106B compares load_PA[5:3] to second physical address field 104B to generate compare signal LS_M1[i], and comparator 106C compares load_PA[5:3] to third physical address field 104C to generate compare signal LS_M2[i]. Comparators 106D–106E are both coupled to receive the next consecutive quadword address of the load (load_PA[5:3]+1). Comparator 106D compares load_PA[5:3]+1 to second physical address field 104B to generate compare signal LS_M3[i], and comparator 106E compares load_PA[5:3]+1 to third physical address field 104C to generate compare signal LS_M4[i].

Match logic 108 is coupled to receive the compare signals CLM[i], LS_M1[i], LS_M2[i], LS_M3[i], and LS_M4[i], and is coupled to receive the store byte enables from byte enable field 104F and the load byte enables (load_BE[14:0]) from AGU/TLB 40AA, and generates the match signals corresponding to the store queue entry (RML[i] and RMU[i]). Generally, if compare signal CLM[i] is asserted, the load and the store in entry 100i affect the same cache line. If any of compare signals LS_M1[i] through LS_M4[i] are asserted, then the corresponding quadword addresses match. Given the cache line and quadword match signals and the byte enables for the load and store, match logic 108 may generate the RML[i] and RMU[i] signals. For example, the following equations may be used to generate the RML[i] and RMU[i] signals.

RML[i]=CLM[i] && V && ((LS_M1[i] &&
((store_BE[0] && load_BE[0]) || (store_BE[1] &&
load_BE[1]) ||
(store_BE[2] && load_BE[2]) || (store_BE[3] &&
load_BE[3]))) || (LS_M2[i] &&
((store_BE[8] && load_BE[0]) || (store_BE[9] &&
load_BE[1]) ||
(store_BE[10] && load_BE[2]) || (store_BE[11] &&
load_BE[3]))) || (LS_M3[i] &&
((store_BE[0] && load_BE[8]) || (store_BE[1] &&
load_BE[9]) ||
(store_BE[2] && load_BE[10]) || (store_BE[3] &&
load_BE[11]))) || (LS_M4[i] &&
((store_BE[8] && load_BE[8]) || (store_BE[9] &&
load_BE[9]) ||
(store_BE[10] && load_BE[10]) || (store_BE[11]
&& load_BE[11]))))
RMU[i]=CLM[i] && V && ((LS_M1[i] &&
((store_BE[4] && load_BE[4]) || (store_BE[5] &&
load_BE[5]) ||
(store_BE[6] && load_BE[6]) || (store_BE[7] &&
load_BE[7]))) || (LS_M2[i] &&
((store_BE[12] && load_BE[4]) || (store_BE[13]
&& load_BE[5]) ||
(store_BE[14] && load_BE[6]))) || (LS_M3[i] &&
((store_BE[4] && load_BE[12]) || (store_BE[5] &&
load_BE[13]) ||
(store_BE[6] && load_BE[14]))) || (LS_M4[i] &&
((store_BE[12] && load_BE[12]) || (store_BE[13]
&& load_BE[13]) ||
(store_BE[14] && load_BE[14]))))

It is noted that, in one embodiment, comparator 106E may be deleted since, if load_PA[5:3]=store_PA[5:3] then load_PA[5:3]+1=store_PA[5:3]+1. In such an embodiment, LS_M4[i] would be replaced in the above equations with LS_M1[i].

It is noted that, while in the present embodiment loads and stores which cross a quadword boundary but do not cross a cache line boundary are handled by store queue 68 but loads and stores which cross a cache line boundary are not handled (and may be retried to execute non-speculatively as individual loads and/or stores to the affected cache lines). Other embodiments may handle more or fewer cases of crossing boundaries. For example, an embodiment may handle loads and stores which cross any boundary up to a page boundary. Such an embodiment would store PA[11:3] and PA[11:3]+1 in fields 104C and 104E, and PA[31:12] would be stored in field 104B. Additionally, while the present embodiment illustrates 32 bit physical addresses, other embodiments may employ more or fewer bits for physical addresses (e.g. 36–40 bits, or any number of bits employed in a 64 bit instruction set architecture may be employed). Also, any boundary within the cache line may be supported (e.g. word, doubleword, octword, etc.). Furthermore, embodiments are contemplated which do not handle crossing of a quadword boundary. Such an embodiment may eliminate field 104D and comparators 106C–106E.

Figure 6:
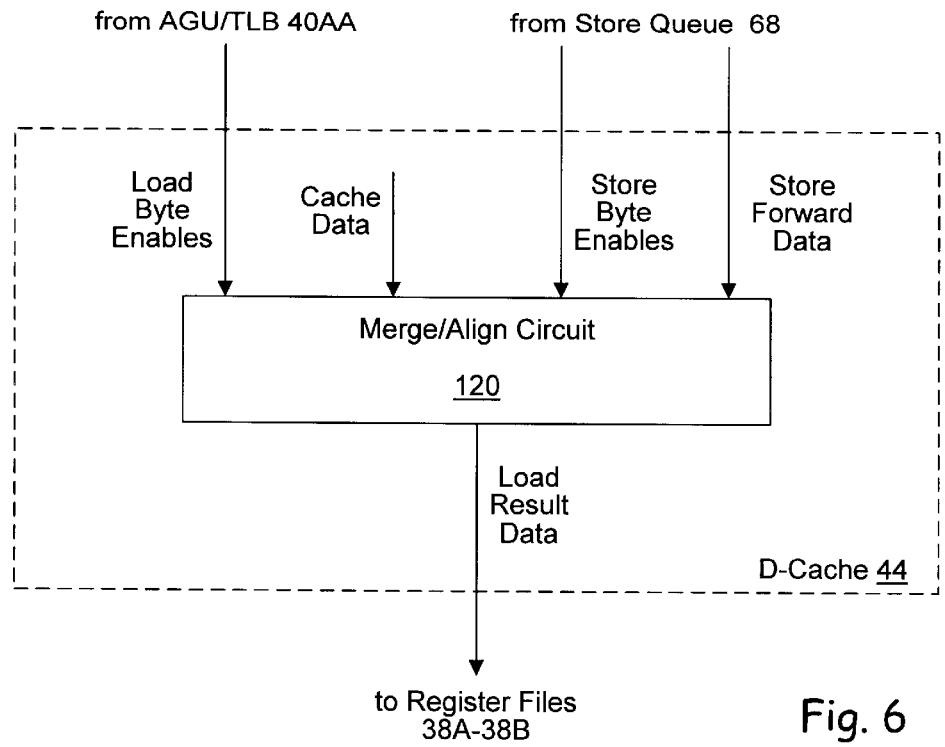
FIG. 6 is a block diagram of one embodiment of a portion of a data cache used to merge store queue data and cache data.

Turning next to FIG. 6, a block diagram illustrating a portion of D-cache 44 is shown. Other embodiments are possible and contemplated. In the embodiment of FIG. 6, D-cache 44 includes a merge/align circuit 120. Merge/align circuit 120 is coupled to receive the load byte enables from AGU/TLB 40AA, cache data from D-cache 44, and the store byte enables and store forward data read from store queue 68. Merge/align circuit 120 is coupled to provide load result data to register files 38A–38B.

Generally, merge/align circuit 120 is configured to merge store forwarded data from store queue 68 and cache data from D-cache 44 to form the load result data for the load. The store byte enables specify which data bytes are valid from store queue 68, and the remaining bytes may be filled with cache data. Additionally, the store forward data is memory aligned, as is the cache data. The load byte enables specify the bytes being accessed by the load, and thus the merged data may be register-aligned in response to the load byte enables.

Figure 7:
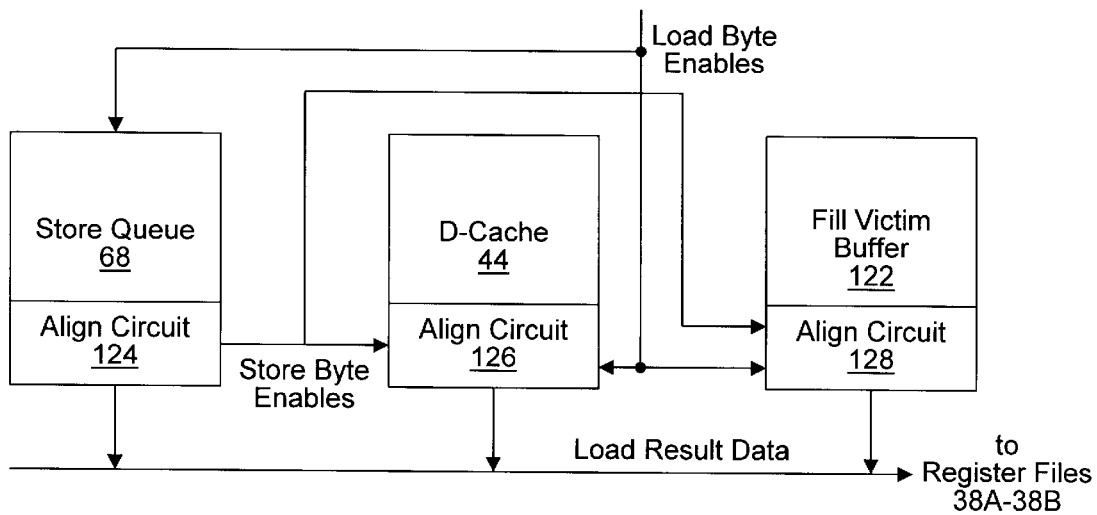
FIG. 7 is a block diagram of another embodiment of a data merging circuit.

Turning now to FIG. 7, another embodiment for performing the merge and alignment operations to generate load result data is shown. In the embodiment of FIG. 7, align circuits are included within each of store queue 68, data cache 44, and a fill victim buffer 122 (reference numerals 124, 126, and 128, respectively). Store queue 68 provides the store byte enables read from the hitting entries of store queue 68 to align circuits 126 and 128. Additionally, align circuit 124 selectively drives bytes on the load result data bus to register files 38A–38B. More particularly, bytes which are indicated as valid by the store byte enables and which are indicated as accessed by the load byte enables are driven by store queue 68 on the load result bus (including register-aligning the bytes). D-cache 44 and fill victim buffer 122 (which is a buffer for victim cache lines evicted from D-cache 44 but not yet written to memory) receive the load and store byte enables as well and drive data bytes which are not provided from store queue 68 (again, accounting for register-aligning the bytes). Since fill victim buffer 122 stores victim cache lines, at most one of D-cache 44 and fill victim buffer 122 detect a hit for a given load, and thus at most one of the D-cache 44 and fill victim buffer 122 drive data on the load result bus.

Turning next to FIG. 8, a block diagram of one embodiment of multimatch circuit 90A is shown. Multimatch circuit 90B may be implemented similarly. Other embodiments are possible and contemplated, including static or dynamic combinatorial logic implementations and other custom implementations. In the embodiment of FIG. 8, multimatch circuit 90A includes precharge circuits 130A and 130B, bit lines 132A–32D, senseamps 134A and 134B, voltage comparator 136, and transistors 138A–138N and 140. Precharge circuit 130A is connected to bit lines 132A–132B, and precharge circuit 130B is connected to bit lines 132C–132D. Senseamp 134A is connected to bit lines 132A–132B, and senseamp 134B is connected to bit lines 132C–132D. Each of transistors 138A–138N is connected between bit line 132B and a ground reference, and is coupled to receive a corresponding ML[i] signal from mask circuit 88A. Transistor 140 is connected between bit line 132D and a ground reference, and is coupled to receive a ML[Dummy] signal. Voltage comparator 136 is connected to bit lines 132B and 132D and to the multimatch signal.

Generally, precharge circuits 130A–130B precharge each of bit lines 132A–132D to a high voltage during the portion of the clock cycle prior to the match lines being activated. Thus, the bit lines 132A–132D are precharged to approximately the same voltage. If one or more of the ML[i] signals is asserted, the corresponding transistor 138A–138N is activated and drains charge from bit line 132B. Thus, a differential voltage is developed between bit lines 132A–132B. If only one of the ML[i] signals is asserted, then the differential between the bit lines 132A–132B develops at a certain rate based on the size of the transistor and the capacitance of the bit line 132B, among other factors. If two of the ML[i] signals are asserted, the differential is developed at approximately twice the certain rate, if three of the ML[i] signals are asserted, the differential is developed at approximately three times the certain rate, etc. Transistors 138A–138N and 140 may be sized substantially the same, such that the current characteristics of the transistors approximately match.

The ML[Dummy] signal is asserted each clock cycle and is timed to be asserted for the same period that the ML[i] signals are asserted (if a match is detected). Thus, the differential developed between the bit lines 132C–132D may approximate the differential developed between bit lines 132A–132B if one of the ML[i] signals is asserted. Thus, a comparison of the voltages on bit lines 132B and 132D by voltage comparator 136 may determine if more than one of the match lines ML[i] asserted. In other words, if the voltage on bit line 132D is greater than the voltage of bit line 132B by more than a predetermined allowable variation, then a multimatch situation exists and voltage comparator 136 asserts the multimatch signal. Alternatively, voltage comparator 136 may compare the differential voltages between bit lines 132A–132B and bit lines 132C–132D. If the differential voltage between bit lines 132A–132B is greater than the differential between bit lines 132C–132D by a predetermined allowable variation, then voltage comparator 136 asserts the multimatch signal. It is noted that bit line 132D may be presented with a capacitive load equivalent to the load of transistors 138A–138N. For example, in one embodiment the number of transistors coupled to bit line 132D may equal the number of transistors coupled to bit line 132B, with one transistor coupled to ML[Dummy] and other transistors coupled into an "off" state (e.g. gates coupled to ground).

Figure 9:
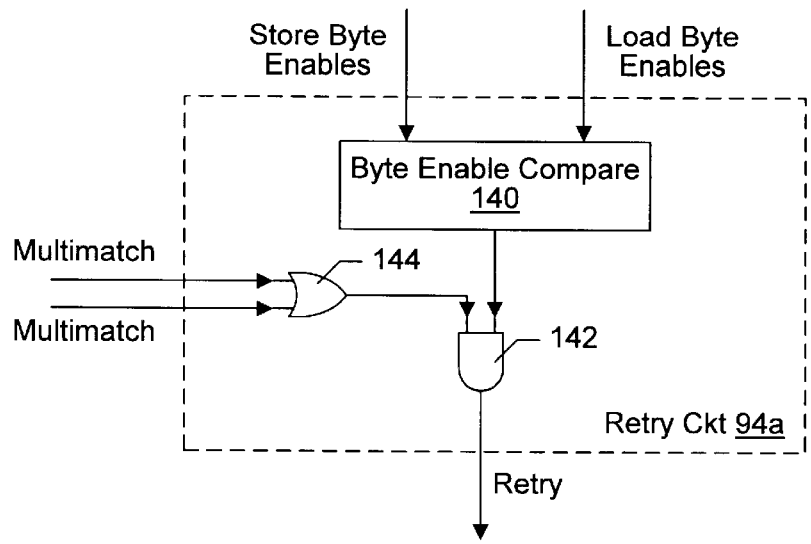
FIG. 9 is a block diagram of one embodiment of a retry circuit shown in FIG. 4.

Turning now to FIG. 9, a block diagram of a second embodiment of retry circuit 94 (shown in FIG. 4) is shown (retry circuit 94a). Retry circuit 94a attempts to filter the detection of multimatch for the case in which the youngest store which is hit by the load also provides each of the bytes accessed by the load. The multimatch detection described above is based on whether or not an entry updates at least one byte accessed by the load, without attempting to determine if the byte is also updated by an older store. However, the pick circuits select the youngest matching store (independently for the upper and lower portions) and read the byte enables corresponding to the selected stores from address/info buffer 82. Retry circuit 94a receives these byte enables (store byte enables in FIG. 9) as well as the load byte enables provided by AGU/TLB 40AA. Retry circuit 94a includes byte enable compare logic 140 which compares the byte enables. If each load byte enable which is set is matched by a corresponding set store byte enable, byte enable compare logic 140 outputs a logic zero to AND gate 142. Thus, the retry signal is not asserted even if one of the multimatch signals (logically ORed together by OR gate 144) is asserted. If at least one load byte enable is set and a corresponding store byte enable is clear, then byte enable compare logic 140 outputs a logic one to AND gate 142 and the retry signal is asserted if one or both of the multimatch signals are asserted. Thus, if the youngest matching store provides each byte accessed by the load, the retry circuit 94a does not retry the load and the load completes.

It is noted that, while the retry circuit 94a as shown in FIG. 9 treats the byte enables as a whole for filtering multimatch detection, the byte enables may be divided into byte enables corresponding to the upper and lower portions and may be used to filter the corresponding multimatch signals separately, then combine the filtered multimatch signals to generate the retry signal. It is further noted that two byte enables correspond to each store queue byte except byte 7 (e.g. byte enables 0 and 8 correspond to store queue byte 0). Byte enable compare logic 140 may OR the two byte enables prior to comparing byte enables to detect whether or not a given byte is provided by the youngest store.

Figure 10:
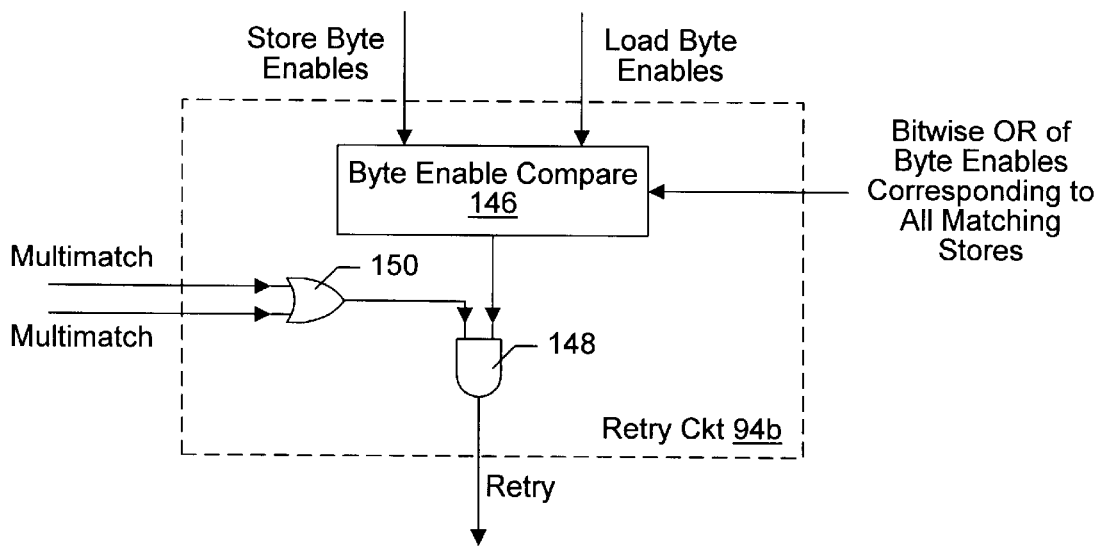
FIG. 10 is a block diagram of another embodiment of a retry circuit shown in FIG. 4.

Turning now to FIG. 10, a third embodiment of retry circuit 94 (shown in FIG. 4) is shown (retry circuit 94b). Retry circuit 94b attempts to filter the detection of multimatch for the case in which the youngest store which is hit updates each byte which is updated by any store within the store queue, even if the store queue does not provide each byte of the load. In this embodiment, address/info buffer 82 provides a bitwise OR of the byte enables corresponding to each store queue entry hit by the load in addition to the byte enables of the youngest store hit by the load. A byte enable compare logic 146 is provided which determines, for each byte accessed by the load, if a corresponding byte enable from the bitwise OR is set and the corresponding byte enable of the store byte enables is clear. If such a situation is detected, a byte is updated by an older store in the store queue which is not updated by the youngest hit store. Byte enable compare logic 146 may output a logical one to AND gate 148 in this case, allowing retry if one or both of the multimatch signals are asserted. On the other hand, if no byte accessed by the load is updated by an older store in the store queue and is not updated by the youngest hit store, then byte enable compare logic 146 outputs a logic zero and thus inhibits assertion of the retry signal even if a multimatch signal is asserted. Similar to retry circuit 94a, retry circuit 94b ORs the multimatch signals (OR gate 150) to provide an input to AND gate 148.

It is noted that, while the retry circuit 94b as shown in FIG. 10 treats the byte enables as a whole for filtering multimatch detection, the byte enables may be divided into byte enables corresponding to the upper and lower portions and may be used to filter the corresponding multimatch signals separately, then combine the filtered multimatch signals to generate the retry signal. It is further noted that two byte enables correspond to each store queue byte except byte 7 (e.g. byte enables 0 and 8 correspond to store queue byte 0). Byte enable compare logic 146 may OR the two byte enables in prior to comparing byte enables to detect whether or not a given byte is provided by the youngest store. It is still further noted that an alternative implementation of retry circuit 94b may compare only the store byte enables and the bitwise OR of the store byte enables corresponding to each matching store. Such an implementation may employ less circuitry to perform the compare, but may allow a retry in a case in which an older store updates a byte not accessed by the load but also not updated by the youngest store which is hit by the load.

It is noted that the term "word" has been used to describe bytes of data treated as a unit. In one embodiment, a word may be defined to be two bytes (and thus a doubleword is four bytes, a quadword is eight bytes, etc.). Other embodiments may define a word differently.

Computer Systems

Figure 11:
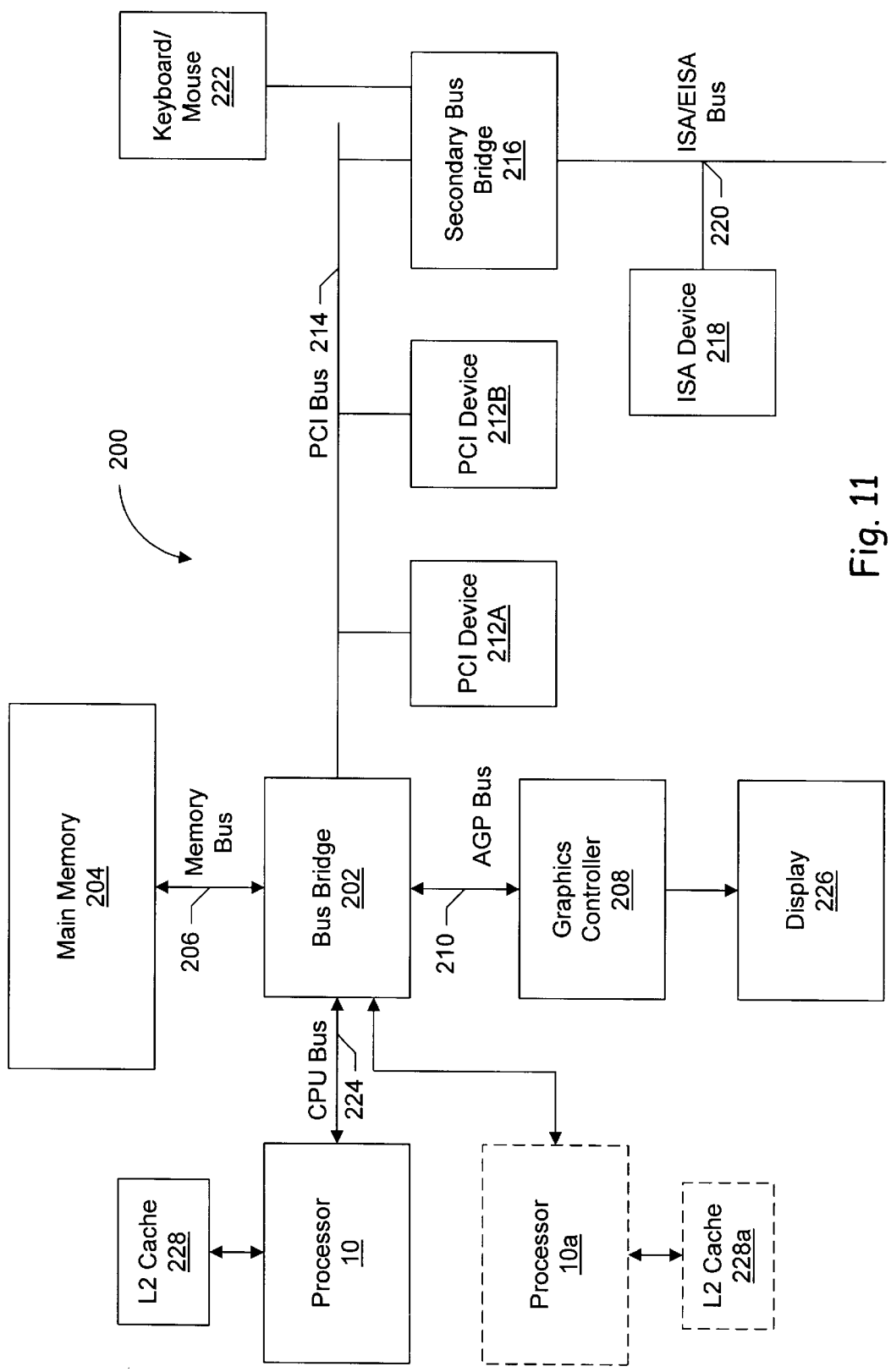
FIG. 11 is a block diagram of one embodiment of a computer system including the processor shown in FIG. 1.

Turning now to FIG. 11, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 11) or may share CPU bus 224 with processor 10. Furthermore, processor 10a may be coupled to an optional L2 cache 228a similar to L2 cache 228.

Figure 12:
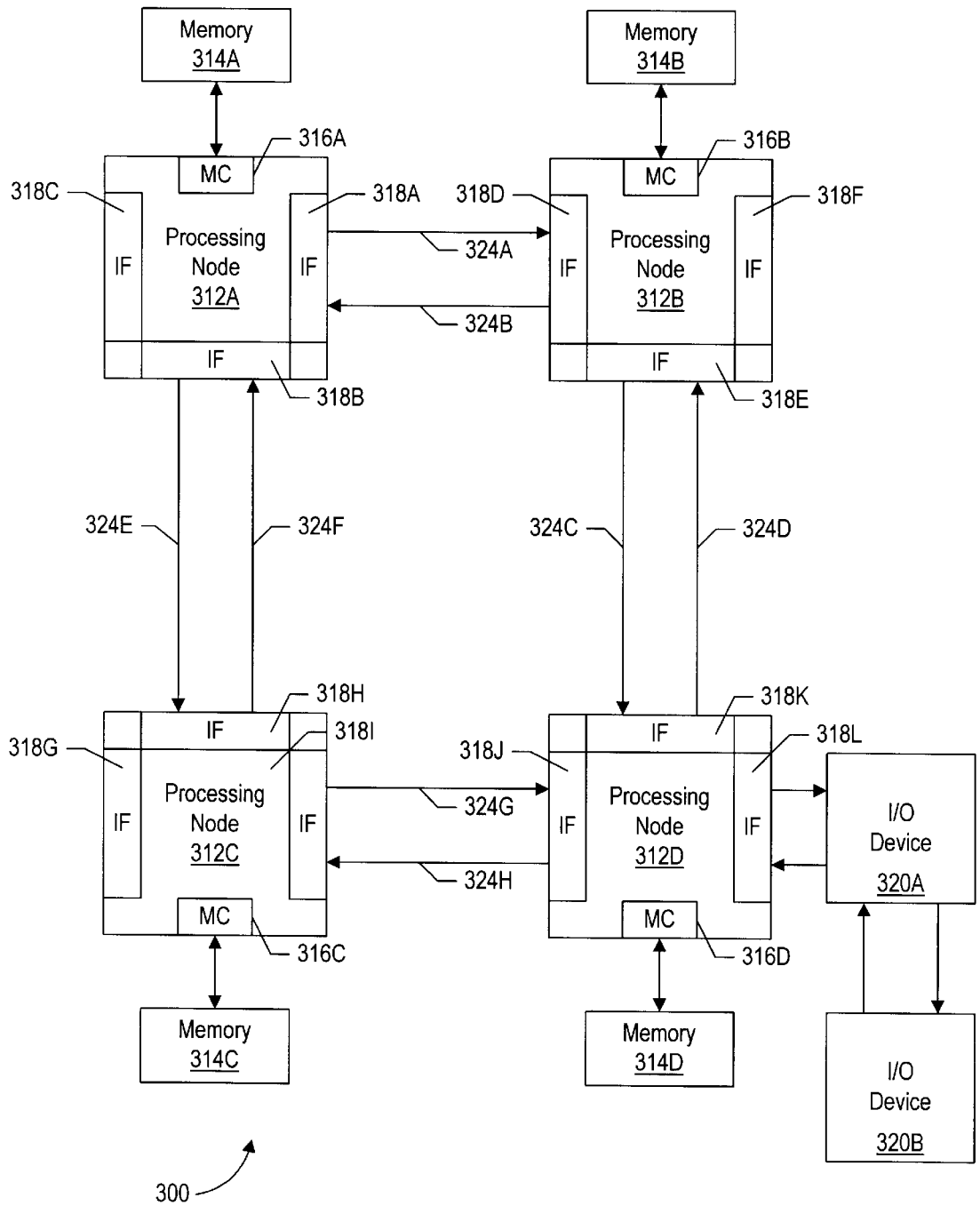
FIG. 12 is a block diagram of another embodiment of a computer system including the processor shown in FIG. 1.

Turning now to FIG. 12, another embodiment of a computer system 300 is shown. Other embodiments are possible and contemplated. In the embodiment of FIG. 12, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C-324H are used to transmit packets between other processing nodes as illustrated in FIG. 12. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 12. Any suitable routing algorithm may be used. Other embodiments of computer system 300 may include more or fewer processing nodes then the embodiment shown in FIG. 12.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A store queue comprising:
   a first buffer including at least a first entry and a second entry, wherein each entry is configured to store information corresponding to a store memory operation, said first buffer including circuitry configured to assert a first match signal in response to detecting a load memory operation hitting said first entry and further configured to assert a second match signal in response to said load memory operation hitting said second entry; and
   a multimatch circuit coupled to receive said first match signal and said second match signal, wherein said multimatch circuit is configured to assert a multimatch signal responsive to an assertion of both said first match signal and said second match signal.

2. The store queue as recited in claim 1 further comprising a mask circuit coupled to said first buffer and said multimatch circuit, wherein said mask circuit is further coupled to receive a store queue number identifying a third entry in said first buffer corresponding to a youngest store memory operation within said store buffer which precedes said load memory operation, and wherein said mask circuit is configured to mask said first match signal and said second match signal responsive to said store queue number.

3. The store queue as recited in claim 2 wherein said mask circuit is configured to deassert said first match signal if said first entry is not between said third entry and a head entry of said store queue, and wherein said mask circuit is further configured to deassert said second match signal if said second entry is not between said third entry and a head entry of said store queue.

4. The store queue as recited in claim 1 wherein said first entry is configured to store a first address corresponding to a first store memory operation, and wherein said second entry is configured to store a second address corresponding to a second store memory operation, and wherein said circuitry is coupled to receive a load address corresponding to said load memory operation and to detect a hit on said first entry if said first address matches said load address, and wherein said circuitry is configured to detect a hit on said second entry if said second address matches said load address.

5. The store queue as recited in claim 4 wherein:
said first address comprises: (i) a first portion identifying a cache line affected by said first store memory operation; (ii) a second portion identifying a first sub-cache line portion affected by said first store memory operation; and
(iii) a third portion identifying a second sub-cache line portion affected by said first store memory operation; and
said second address comprises: (i) a first portion identifying a cache line affected by said second store memory operation; (ii) a second portion identifying a first sub-cache line portion affected by said second store memory operation; and (iii) a third portion identifying a second sub-cache line portion affected by said second store memory operation.

6. The store queue as recited in claim 5 wherein:
said first entry is further configured to store a first plurality of byte enables identifying bytes updated by said first store memory operation, and wherein a first set of said first plurality of byte enables corresponds to said second portion of said first address, and wherein a second set of said first plurality of byte enables corresponds to said third portion of said first address; and
said second entry is further configured to store a second plurality of byte enables identifying bytes updated by said second store memory operation, and wherein a first set of said second plurality of byte enables corresponds to said second portion of said second address, and wherein a second set of said second plurality of byte enables corresponds to said third portion of said second address; and
wherein said circuitry is coupled to receive a plurality of load byte enables corresponding to said load memory operation, and wherein said circuitry is configured assert said first match signal if: (i) said first portion of said first address matches a corresponding first portion of said load address; and (ii) said second portion of said first address matches a corresponding second portion of said load address and said first set of said first plurality of byte enables indicates at least one byte indicated by a corresponding first set of said plurality of load byte enables is updated by said first store memory operation; and
wherein said circuitry is configured assert said second match signal if: (i) said first portion of said second address matches a corresponding first portion of said load address; and (ii) said second portion of said second address matches a corresponding second portion of said load address and said first set of said second plurality of byte enables indicates at least one byte indicated by a corresponding first set of said plurality of load byte enables is updated by said second store memory operation.

7. The store queue as recited in claim 1 further comprising:
a first data buffer configured to store an upper portion of store data corresponding to store memory operations stored in said store buffer; and
a second data buffer configured to store a lower portion of store data corresponding to store memory operations stored in said store buffer; and
wherein said circuitry is configured to match entries in said first buffer independently for store data stored in said first data buffer and store data stored in said second data buffer.

8. The store queue as recited in claim 7 wherein said first match signal and said second match signal correspond to store data stored in said first data buffer.

9. The store queue as recited in claim 8 wherein said circuitry is configured to assert a third match signal corresponding to said first entry and said second data buffer, and wherein said circuitry is configured to assert a fourth match signal corresponding to said second entry and said second data buffer, and wherein said store queue further comprises a second multimatch circuit configured to assert a second multimatch signal responsive to both said third signal and said fourth signal being asserted.

10. The store queue as recited in claim 1 further comprising a retry circuit configured to signal a retry of said load memory operation responsive to said multimatch signal being asserted.

11. The store queue as recited in claim 10 wherein said retry circuit is coupled to receive a set of store byte enables from said first buffer, said store byte enables corresponding to a youngest store memory operation for which a corresponding match signal is asserted, and wherein said retry circuit is configured to inhibit signalling a retry of said load memory operation if said store byte enables indicate that each byte accessed by said load memory operation is provided by said youngest store memory operation.

12. The store queue as recited in claim 11 wherein said retry circuit is coupled to receive a set of first store byte enables from said first buffer, said first store byte enables corresponding to a youngest store memory operation for which a corresponding match signal is asserted, and wherein said retry circuit is coupled to receive a set of second store byte enables from said first buffer, said second store byte enables comprising a bit-wise OR of byte enables corresponding to each store memory operation for which a corresponding match signal is asserted, and wherein said retry circuit is configured to signal said retry of said load memory operation if at least one of said second store byte enables indicates a byte accessed by said load memory operation is updated by one of said store memory operations and a corresponding one of said first store byte enables indicates that said byte is not updated by said youngest store memory operation.

13. A processor comprising:
a store queue including:
a first buffer including at least a first entry and a second entry, wherein each entry is configured to store information corresponding to a store memory operation, said first buffer including circuitry configured to assert a first match signal in response to detecting a load memory operation hitting said first entry and farther configured to assert a second match signal in response to said load memory operation hitting said second entry; and
a multimatch circuit coupled to receive said first match signal and said second match signal, wherein said multimatch circuit is configured to assert a multimatch signal responsive to an assertion of both said first match signal and said second match signal; and
a data cache coupled to said store queue, wherein said data cache is configured to merge cache data with store queue data to produce load data corresponding to said load memory operation.

14. The processor as recited in claim 13 wherein said store queue further includes:
a first data buffer configured to store an upper portion of store data corresponding to store memory operations stored in said store buffer; and a second data buffer configured to store a lower portion of store data corresponding to store memory operations stored in said store buffer; and wherein said circuitry is configured to match entries in said first buffer independently for store data stored in said first data buffer and store data stored in said second data buffer.

15. The processor as recited in claim 14 wherein said first match signal and said second match signal correspond to store data stored in said first data buffer.

16. The processor as recited in claim 15 wherein said circuitry is configured to assert a third match signal corresponding to said first entry and said second data buffer, and wherein said circuitry is configured to assert a fourth match signal corresponding to said second entry and said second data buffer, and wherein said store queue further comprises a second multimatch circuit configured to assert a second multimatch signal responsive to both said third signal and said fourth signal being asserted.

17. A computer system comprising:
a processor comprising:
a store queue including:
a first buffer including at least a first entry and a second entry, wherein each entry is configured to store information corresponding to a store memory operation, said first buffer including circuitry configured to assert a first match signal in response to detecting a load memory operation hitting said first entry and further configured to assert a second match signal in response to said load memory operation hitting said second entry; and
multimatch circuit coupled to receive said first match signal and said second match signal, wherein said multimatch circuit is configured to assert a multimatch signal responsive to an assertion of both said first match signal and said second match signal; and
a data cache coupled to said store queue, wherein said data cache is configured to merge cache data with store queue data to produce load data corresponding to said load memory operation; and
an input/output (I/O) device configured to communicate between said computer system and another computer system to which said I/O device is couplable.

18. The computer system as recited in claim 17 wherein said I/O device comprises a modem.

19. The computer system as recited in claim 17 further comprises a second processor identical to said processor.

20. The computer system as recited in claim 17 further comprising an audio I/O device.

21. The computer system as recited in claim 20 wherein said I/O device comprises a sound card.

22. The computer system as recited in claim 17 further comprising a second processor including:
a second store queue including:
a second buffer including at least a third entry and a fourth entry, wherein each entry is configured to store information corresponding to a store memory operation, said second buffer including circuitry configured to assert a third match signal in response to detecting a load memory operation hitting said third entry and further configured to assert a fourth match signal in response to said load memory operation hitting said fourth entry; and
a second multimatch circuit coupled to receive said third match signal and said fourth match signal, wherein said second multimatch circuit is configured to assert a second multimatch signal responsive to an assertion of both said third match signal and said fourth match signal; and
a second data cache coupled to said second store queue, wherein said second data cache is configured to merge cache data with store queue data to produce load data corresponding to said load memory operation.

23. A method comprising:
receiving load information corresponding to a load memory operation in a store queue, said store queue including a plurality of entries, each of said plurality of entries configured to store information corresponding to a store memory operation;
asserting a multimatch signal in response to said load memory operation hitting two or more of said plurality of entries;
deasserting said multimatch signal in response to hitting one or less of said plurality of entries; and
retrying said load memory operation responsive to said asserting said multimatch signal.

24. The method as recited in claim 23 further comprising merging cache data from a data cache with data from said store queue to provide load data corresponding to said load memory operation responsive to said deasserting said multimatch signal.

25. The method as recited in claim 23 wherein said store queue includes a first data buffer configured to store an upper portion of store data corresponding to each store memory operation in said store queue and a second data buffer configured to store a lower portion of store data corresponding to each store memory operation in said store queue, and wherein said asserting said multimatch signal comprises:
asserting a first multimatch signal in response to said load memory operation hitting store data stored in said first data buffer; and
independently asserting a second multimatch signal in response to said load memory operation hitting store data stored in said second data buffer.

26. The method as recited in claim 23 further comprising:
providing store byte enables from said store queue, said store byte enables corresponding to a youngest store memory operation in said store buffer on which a hit is detected; and
inhibiting said retrying if said store byte enables indicate that each byte accessed by said load memory operation is updated by said youngest store memory operation.

27. The method as recited in claim 23 further comprising:
providing store byte enables from said store queue, said store byte enables corresponding to a youngest store memory operation in said store buffer on which a hit is detected;
providing OR store byte enables from said store queue, said OR store byte enables indicating bytes updated by each store memory operation in said store buffer on which a hit is detected; and
retrying said load memory operation responsive to said multimatch signal and said OR store byte enables indicating that at least one byte accessed by said load is updated by a store memory operation in said store queue and said store byte enables indicating that said youngest store memory operation does not updated said at least one byte.

28. An apparatus comprising:
a store buffer comprising a plurality of entries, each entry configured to store information corresponding to a store memory operation; and a multimatch circuit coupled to the store buffer and configured to output a multimatch signal indicative, when asserted, that a load memory operation hits two or more of the plurality of entries of the store buffer, and wherein the multimatch circuit is configured to deassert the multimatch signal responsive to the load memory operation hitting one or fewer of the plurality of entries of the store buffer.

29. The apparatus as recited in claim 28 further comprising an instruction dispatch circuit coupled to receive the multimatch signal and configured to retry the load memory operation in response to an assertion of the multimatch signal.

30. The apparatus as recited in claim 29 wherein the instruction dispatch circuit comprises a scheduler.

31. The apparatus as recited in claim 28 further comprising a mask circuit coupled to receive a store queue number indicative of a first entry of the plurality of entries, the first entry storing a youngest store memory operation which precedes the load memory operation, and wherein the mask circuit is configured to restrict the detection of hits in the store buffer to entries between the first entry and a head of the store buffer.

32. The apparatus as recited in claim 28 further comprising:

a first data buffer configured to store an upper portion of store data corresponding to each store memory operation represented in the store buffer;

a second data buffer configured to store a lower portion of store data corresponding to each store memory operation represented in the store buffer; and circuitry configured to detect matches between a load memory operation and the store memory operations in the buffer, wherein the circuitry is configured to match entries independently for the upper portion and the lower portion.

33. The apparatus as recited in claim 32 further comprising a second multimatch circuit coupled to the store buffer and configured to assert a second multimatch signal responsive to a hit in two or more of the plurality of entries for the upper portion, and wherein the multimatch circuit is configured to assert the multimatch signal responsive to a hit in two or more of the plurality of entries for the lower portion.

* * * * *

UNITED STATES PATENT AND TRADEMARK OFFICE
CERTIFICATE OF CORRECTION

PATENT NO.    : 6,523,109 B1
DATED         : February 18, 2003
INVENTOR(S)   : Stephan G. Meier It is certified that error appears in the above-identified patent and that said Letters Patent is hereby corrected as shown below:

<u>Column 26,</u>
Line 51, please delete "farther", and insert -- further -- in place thereof.

Signed and Sealed this

Eighth Day of April, 2003

JAMES E. ROGAN
*Director of the United States Patent and Trademark Office*